Patented Mar. 1, 1932

1,848,074

UNITED STATES PATENT OFFICE

WALTER BRUCK, OF MANNHEIM, GERMANY, ASSIGNOR TO GENERAL ANILINE WORKS, INC., OF NEW YORK, N. Y., A CORPORATION OF DELAWARE

HALOGENATED ANTHRAQUINONEBENZACRIDONE

No Drawing. Application filed April 24, 1930, Serial No. 447,084, and in Germany January 25, 1929.

The present invention relates to the production of anthraquinone-2.1(N)-benzacridones in which at least the hydrogen atoms of the benzene nucleus are substituted by halogen.

In my copending application for an improvement in production of chloroanthraquinoneacridone Ser. No. 421,727, filed January 18, 1930, of which the present application is a continuation in part, I have described a process for the production of an anthraqinone-2.1(N)-benzacridone containing about 5 atoms of chlorine by treating 1-phenyliminoanthraquinone containing a methyl group in ortho position to the imino group in an organic solvent with a chlorinating agent, separating the chlorination product more readily soluble in organic solvents from the reaction mixture and splitting off chlorine or hydrogen chloride from the separated product. The product containing about 5 atoms of chlorine yields on boiling with diethylaniline an anthraquinone-2.1-(N)-benzacridone containing about 4 atoms of chlorine which product on chlorination again yields the intitial material containing 5 atoms of chlorine.

I have now found that a similar product and products having a structure similar to that of the aforesaid chloroanthraquinone-2.1-(N)benzacridone are obtained by condensing 1-halogenanthraquinone-2-carboxylic acid or derivatives thereof with 2.3.4.5-tetrahalogen anilines having a free 6-position or by condensing 1-halogenanthraquinones with free 2-position with 2-amido-benzoic acids in which the hydrogen atoms of the benzene nucleus are substituted by halogen, acridone ring closure then being effected.

The products thus obtained correspond to the formula:

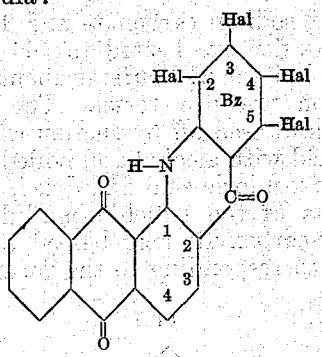

Products of the same structure containing 4 halogen atoms are also obtained by brominating Bz 3.5-dihalogen-anthraquinone-2.1(N)-benzacridones which are obtainable in the aforesaid manner by employing a 3.5-dihalogenaniline as condensing component. When chlorinating the said initial material pentahalogen dervatives are obtained containing a chlorine atom in the 4-position of the anthraquinone nucleus which chlorine atom can be replaced by hydrogen by boiling the pentachloro derivative with diethylaniline. The aforesaid pentahalogen derivatives are also obtained when starting with a 1.4-dichloroanthraquinone-2-carboxylic acid and condensing it with a 2.3.4.5-tetrahalogen aniline, or with a 3.5-dihalogen aniline and halogenating the condensation product. The halogen atom in the 4-position of the anthraquinone nucleus causes a surprisingly marked change of the shades to blue; the products are dyestuffs which in addition to excellent fastness properties have the brilliancy of the dyestuffs of the thioindigo class which are similar to them in shade.

The following examples will further illustrate the nature of this invention, but the invention is not restricted to these examples. The parts are by weight.

*Example 1*

38 parts of 1-chloroanthraquinone-2-carboxylic acid benzyl ester of the formula:

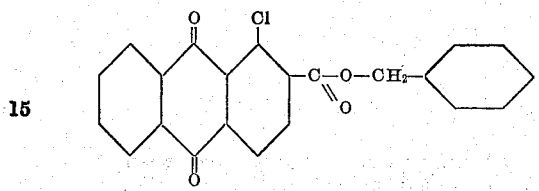

18 parts of m-dichloroaniline of the formula:

6 parts of sodium carbonate and 1 part of copper powder are heated in 500 parts of butyl alcohol for 24 hours at about 180° C. in an iron pressure vessel. The reaction product is filtered off by suction after cooling, washed with alcohol and boiled up with dilute hydrochloric acid and dried.

10 parts of the 1-dichloroanilidoanthraquinone-2-carboxylic acid benzyl ester thus obtained corresponding to the formula:

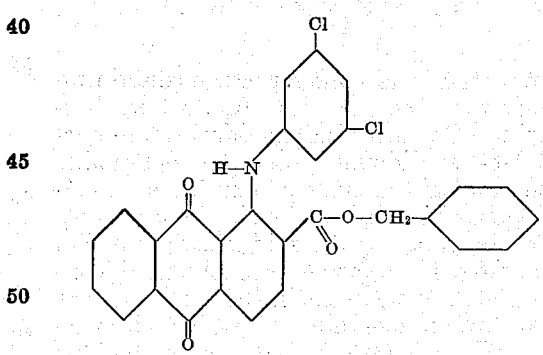

are suspended in 50 parts of dry nitrobenzene. After the addition of 5 parts of acetic acid anhydride the whole is stirred for about 2 hours at from 95° to 100° C. The whole is then diluted with 100 parts of dry nitrobenzene, about 0.8 part of concentrated sulphuric acid are added and the whole is kept at from 90° to 100° C. for another 2 hours.

The reaction mixture is freed from nitrobenzene by distillation with steam and acid constituents are removed by extraction with dilute caustic soda. The Bz-3.5-dichloroanthraquinone-2.1(N)-benzacridone of the formula:

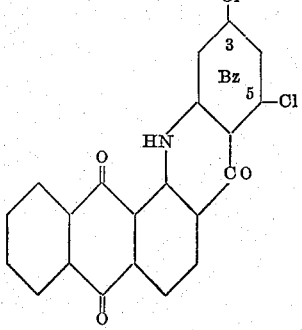

is obtained analytically pure by crystallization of the crude product from nitrobenzene. It dissolves in concentrated sulphuric acid giving an orange yellow solution and furnishes a violet vat from which cotton is dyed orange shades.

*Example 2*

20 parts of 1-chloroanthraquinone-2-carboxylic acid benzyl ester are heated for 4 hours at from 185° to 195° C. with 9 parts of 2.3.4.5-tetrachloroaniline, 6.2 parts of anhydrous sodium acetate, 0.3 part of copper oxide and 30 parts of nitrobenzene. After cooling the melt is poured into 200 parts of concentrated sulphuric acid, care being taken that the temperature does not rise above 50° C. After stirring for 1 hour the solution is poured into water and the nitrobenzene is driven off with steam. The remaining 1-tetrachloroanilidoanthraquinone - 2 - carboxylic acid is filtered off by suction and dried.

23 parts of the acid are stirred for 2 hours at 150° C. with 90 parts of dry nitrobenzene and 11 parts of acetic acid anhydride, the melt is diluted with 90 parts of dry nitrobenzene and 2.7 parts of concentrated sulphuric acid are gradually added at from 95° to 100° C. The temperature is then kept the same for about 4 hours, and the whole is then allowed to cool and the reaction product is filtered off by suction. It is washed with nitrobenzene, dilute caustic soda is added, and the product is freed from nitrobenzene and alkali-soluble impurities by steam distillation and subsequent filtration.

The Bz-2.3.4.5-tetrachloroanthraquinone-2.1(N)-benzacridone thus obtained corresponding to the formula:

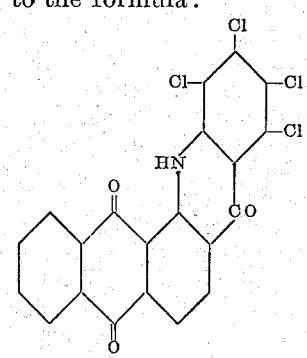

is a reddish yellow substance which only dissolves in organic solvents of high boiling point with great difficulty. It crystallizes from trichlorobenzene in long orange yellow matter needles. The color of the solution in concentrated sulphuric acid is orange yellow, the vat is violet and the dyeings on cotton an orange yellow of excellent fastness.

*Example 3*

4 parts of the Bz 3.5-dichloranthraquinone-2.1(N)-benzacridone obtained according to Example 1 are suspended in 80 parts of nitrobenzene and 0.1 part of iodine and, after heating to 70° C., 5 parts of bromine are then slowly added to the suspension while stirring. In the course of about 5 hours the temperature is raised to the boiling point, the reaction mixture being then allowed to cool. The orange yellow crystals of Bz 3.5-dichloro - Bz 2.4 - dibromanthraquinone-2.1(N)-benzacridone corresponding to the formula:

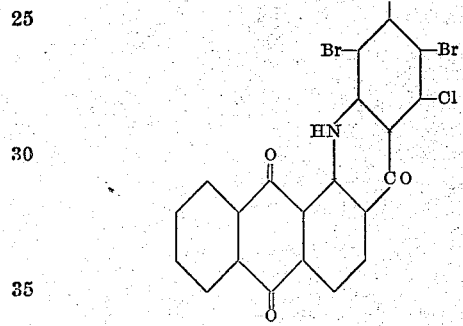

are filtered off. The product may be recrystallized from trichlorobenzene, it dissolves in concentrated sulphuric acid giving an orange yellow solution and dyes cotton fast orange shades from a violet vat.

*Example 4*

2 parts of the pentachloroanthraquinone-2.1(N)-benzacridone obtainable according to my copending application Ser. No. 421,727 are boiled for about 1 hour in 20 parts of diethylaniline. The coloration of the solution which initially is red turns to orange yellow and brown yellow crystals separate out. After cooling, the reaction product is filtered off, washed with diethylaniline, ethyl alcohol and water and may be recrystallized from trichlorobenzene in order to obtain it quite pure. The properties of the dyestuff thus produced are the same as those of the product described in Example 2.

*Example 5*

22 parts of 1.4-dichloroanthraquinone-2-carboxylic acid benzyl ester are heated for 4½ hours at from 180° to 190° C. with 10 parts of 2.3.4.5-tetrachloroaniline, 6 parts of anhydrous sodium acetate, 0.3 part of copper oxide and 30 parts of nitrobenzene. After cooling the melt is introduced into 200 parts of concentrated sulphuric acid and is stirred for 1 hour at from 35° to 40° C. The solution is then poured into water and the nitrobenzene is expelled with steam. The remaining 1-tetrachloroanilido-4-chloroanthraquinone-2-carboxylic acid is filtered off by suction and dried.

22 parts of the said acid are stirred for 1½ hours at from 145° to 155° C. with 80 parts of dry nitrobenzene and 10 parts of acetic acid anhydride. The melt is then diluted with 80 parts of dry nitrobenzene and 2.5 parts of concentrated sulphuric acid are slowly introduced at from 95° to 100° C. The whole is kept at the same temperature for about 3 hours, and is then allowed to cool when the reaction product is filtered off by suction. It is washed with nitrobenzene and is freed from solvent by steam distillation. The product corresponding to the formula:

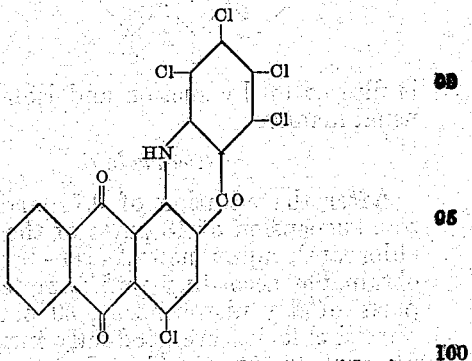

dissolves in concentrated sulphuric acid giving an orange red coloration, it gives a violet vat and yields on cotton a brilliant bluish rose shade of excellent fastness.

The dyestuff may be crystallized from trichlorobenzene, in which as in all organic solvents it is soluble only with great difficulty, and is thus obtained in prismatic needles.

*Example 6*

23 parts of the Bz-2.3.4.5-tetrachloroanthraquinone-2.1 (N)-benzacridone prepared according to Example 2 are suspended in 600 parts of dry nitrobenzene and after the addition of 2 parts of iodine about 90 parts of sulphuryl chloride are allowed to run in while stirring at from 90° to 100° C. during the course of 1 hour. The whole is stirred at the same temperature for about 5 hours, the excess of sulphuryl chloride is expelled with a stream of dry air and the reaction product is filtered off by suction after cooling. It is washed with nitrobenzene and freed from solvent by steam distillation. The product thus obtained may be crystallized from trichlorobenzene. It corresponds with the dyestuff described in the foregoing example as regards its tinctorial and other properties.

*Example 7*

4.3 parts of 4-Bz 3.5-trichloroanthraquinone-2.1(N)-benzachridone, (obtainable from 1.4-dichloroanthraquinone-2-carboxylic acid by condensation with 3.5-dichloroaniline and subsequent acridone ring closure) are stirred with 0.4 part of iodine and 120 parts of dry nitrobenzene, and then 9 parts of sulphuryl chloride are gradually introduced at from 95° to 100° C. The whole is stirred for about 3 hours at the same temperature and is then allowed to cool. The reaction product of the formula:

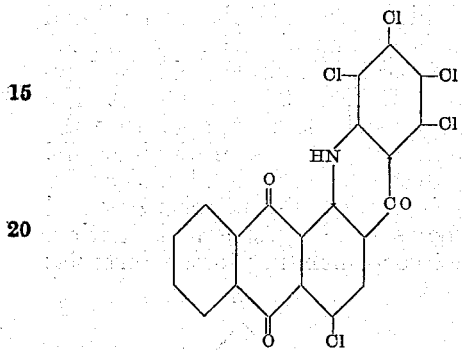

is filtered off by suction and isolated in the usual manner.

*Example 8*

After the addition of 0.7 part of iodine to a suspension of 13 parts of the Bz 3.5-dichloroanthraquinone - 2.1 (N) - benzacridone obtainable according to Example 1 in 300 parts of dry nitrobenzene, 30 parts of sulphuryl chloride are gradually introduced at from 90° to 100° C. The whole is stirred for about 4 hours at the same temperature, cooled and the reaction mass filtered off by suction. The working up is carried out in the same manner as in the foregoing examples. The product may be crystallized from trichlorobenzene and is the pentachloroanthraquinone-2.1(N)-benzacridone hereinbefore described according to analysis and properties.

What I claim is:—

1. As new articles of manufacture pentahalogen derivatives of anthraquinone-2.1 (N)-benzacridone in which four halogen atoms are present in the benzene nucleus and which contain the fifth halogen atom in the 4-position of the anthraquinone nucleus, which dyestuffs dissolve in concentrated sulphuric acid giving orange red solutions and dye cotton bluish red shades from violet vats.

2. As a new article of manufacture 4-Bz-2.3.4.5-pentachloroanthraquinone-2.1 (N)-benzacridone dissolving in concentrated sulphuric acid giving an orange red solution and dyeing cotton brilliant bluish rose shades from a violet vat.

In testimony whereof I have hereunto set my hand.

WALTER BRUCK.